United States Patent [19]

Young

[11] 4,049,919

[45] Sept. 20, 1977

[54] COMMUNICATION SYSTEM TRUNK CIRCUIT

[75] Inventor: John S. Young, Addison, Ill.

[73] Assignee: GTE Automatic Electric Laboratories Incorporated, Northlake, Ill.

[21] Appl. No.: 738,507

[22] Filed: Nov. 3, 1976

[51] Int. Cl.$^2$ .............................................. H04Q 3/18
[52] U.S. Cl. ............................................... 179/18 FA
[58] Field of Search .............. 179/18 F, 18 FA, 81 R, 179/84 R

[56] References Cited

U.S. PATENT DOCUMENTS

| 3,808,377 | 4/1974 | Young ............................ 179/18 FA |
| 4,007,335 | 2/1977 | Hetherington et al. ........... 179/18 FA |

FOREIGN PATENT DOCUMENTS 1,201,093  8/1970  United Kingdom ............ 179/18 FA Primary Examiner—Thomas A. Robinson

[57] ABSTRACT

A trunk circuit for interconnecting an electronic and a step-by-step electromechanical switching exchange including a sensing circuit that is transparent to the transmission and supervisory signals. The sensing circuit consists of a pair of voltage dividers composed of at least four resistors each with the midpoint of each voltage divider connected to a voltage differential detecting means. The midpoints of the voltage dividers have substantially equal voltage levels in one state of the transmission path and have a measurable voltage differential in another state of the transmission path. Under conditions where a subscriber flash signal is not to be propagated through, the voltage dividers are arranged to have their resistance decreased, simulating an off-hook condition.

6 Claims, 2 Drawing Figures

COMMUNICATION SYSTEM TRUNK CIRCUIT

BACKGROUND OF THE INVENTION

1. Field of the Invention

This invention relates generally to telephone switching systems and more particularly to supervisory and control circuits for detecting the operative state of communication lines and effecting control conditions in response thereto.

2. Description of the Prior Art

It is anticipated that in many instances electronic exchanges will be installed in the same building with existing step-by-step exchanges, with the objective of arresting the growth of and eventually phasing out the step-by-step equipment. The combined equipment therefore serves its area as if it were a single switching machine, although it is necessary to provide internal trunks between the two systems so that lines and trunks connected to one system can reach lines and trunks connected to the other. Further, economies are realized if trunk groups to other sites can be treated as a single group, instead of being subdivided into step-by-step and electronic exchange groups. Such a group would then appear on the inlets and/or outlets of one machine; calls to or from lines or trunks on the other therefore require "tandem" connections via interoffice junctors. Two types are required. One type is used for calls advanced from the step-by-step exchange to destinations reached via the electronic exchange; the other is used for calls proceeding in the opposite direction.

It is desirable for reasons of transmission that additional supervisory bridges not be included in connections of this type; i.e., the junctor is preferably "transparent" while in a talking mode, particularly on toll calls. This objective is easily attained when the call is extended from the step-by-step to the electronic exchange: the last selector rank switches through to the electronic exchange incoming circuit. The path is held under program control by ground returned on the C lead by the latter circuit.

OUTGOING TO A COLLOCATED STEP-BY-STEP

For calls which are to be extended from the electronic exchange to a destination reached via the step-by-step exchange, a plan similar to the above could be considered: the electronic exchange would then "switch through" to the step switch train, with the calling party supervised at the last switch rank or outgoing trunk. Calling party disconnect would be recognized by the electronic exchange when the path holding ground through the step-by-step switches on lead C disappeared at the interface between the outgoing junctor and the step-by-step incoming selector. The electronic exchange network path would then be restored. However there are many deficiencies in such a plan: first the electronic exchange offers customer calling and CO Centrex services which require subscribers to flash to invoke special features. The electronic exchange is arranged to time on-hooks from the calling party to discriminate between flash and disconnect, and to block such supervisory changes from being extended toward the facility until a disconnect has been recognized. If the calling party were supervised in the step-by-step as outlined, a subscriber flash would cause an unwanted release of the step-by-step switch train before any indication reached the electronic exchange software, and also the electronic exchange can offer Local Automatic Message Accounting (LAMA), and Message Rate Service (MRS) for which it is necessary to sense answer supervision from the called party. Again, the switch-through plan does not provide a means for this supervisory signal to be obtained by the electronic machine.

It is an object of the present invention to provide an arrangement for overcoming the above limitations while preserving virtual transparency during the conversational state.

As detailed in a previous disclosure upon which U.S. Pat. No. 3,808,377 was issued, two resistance divider networks have values of resistance that are large with respect to resistances of circuit battery feed devices and subscriber loops so that the dividers have negligible effect upon these other circuit elements. Voltages at divider mid-points were shown to vary as a function of subscriber loop conditions, and voltage comparison means can be used to detect the supervisory states of the associated subscriber, even in the presence of longitudinal voltages often induced upon such facilities by external disturbing influences.

SUMMARY OF THE INVENTION

In the present implementation, two divider networks are made up with four resistors each, instead of with two resistors each as described in the above reference. Inputs are via a diode bridge, making this part of the circuit independent of the polarity on the tip and ring. The inner resistors of each network are high resistances to provide negligible loading of the tip and ring conductors, but the outer resistors are of much lower values of resistance.

During subscriber off-hook, voltages at the midpoint nodes cause the comparator output to register an appropriate indication to the control complex. When the subscriber hangs up or depresses the hookswitch, node voltages change in a manner which causes the comparator output to release the indication to the control complex and to activate switches which bridge the inner resistors. In the resulting new configuration, voltages at the nodes between the outer resistors remain substantially at the same levels as those existing before the inner resistors were bridged. The circuit remains responsive to supervisory changes, but the values of the outer resistors are chosen to provide holding current for the battery feed relay in the step-by-step exchange, thus preventing its response to an on-hook until the electronic exchange control complex determines that a true disconnect has occurred, and responds by modifying the circuit configuration. Thus, "blocked supervision" is obtained on a transparent circuit.

A second indicator to the control complex senses the polarity on the tip and ring, thus providing called party answer supervision. This sensing arrangement is also of a high impedance, to offer negligible loading of the transmission pair.

BRIEF DESCRIPTION OF THE DRAWING

The foregoing and other objects and features of this invention will be better understood from a consideration of the detailed description of one illustrative embodiment thereof taken in conjunction with the accompanying drawings in which.

DESCRIPTION OF THE PREFERRED EMBODIMENT

ELECTRONIC EXCHANGE OUTGOING TRUNK TO COLLOCATED STEP-BY-STEP TYPICAL CALL SEQUENCE

Figure 1:
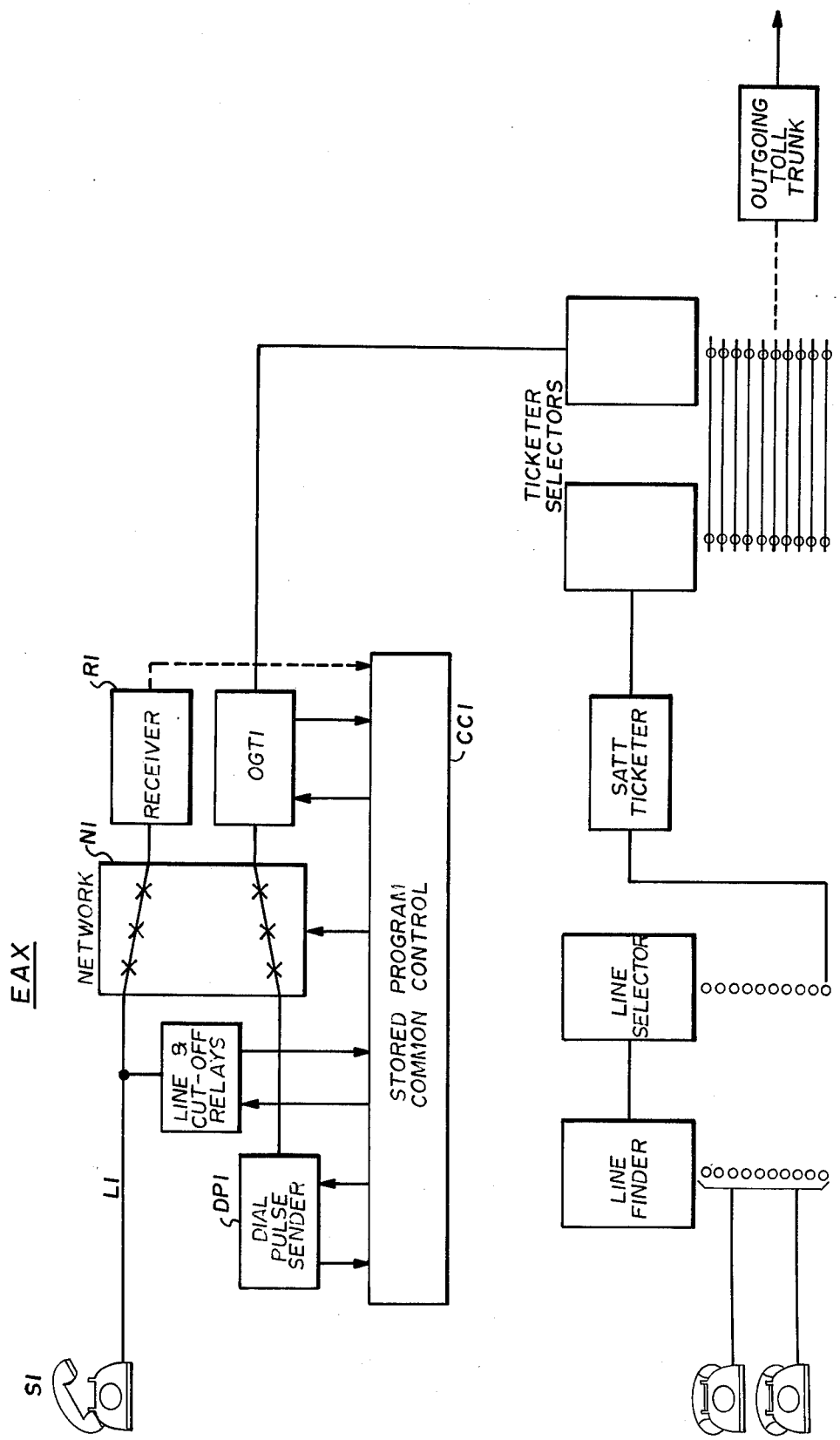
FIG. 1 is a schematic representation of an electronic exchange collocated with a step-by-step exchange.

For this example, the trunk circuit is wired between the electronic exchange switch network and a step-by-step ticketer selector switch. Calls may be extended via the latter and possibly an additional rank of selectors to reach a trunk to a destination for which toll charging is applicable. As shown, a collocated Strowger Automatic Toll Ticketing SATT machine may also have access to the same toll routes. The following steps in setting up a call are only briefly described to illustrate the environment within which the circuit of the present invention is to operate. FIG. 1 shows the configuration applicable to these steps in the example call, which include:

1. An electronic exchange subscriber S1 initiates a call-for-service by lifting the station handset.
2. The system recognizes the call-for-service and responds by switching the calling line L1 through the network N1 to an idle receiver R1, and operating the cut-off relay LCO1 to disconnect the subscriber line relay. The receiver includes a capability for extending dial tone when placed into the appropriate state by the common control CC1.
3. After hearing dial tone, the subscriber begins dialing the called number, assumed to be via open and closed intervals on the loop (dial pulse). When the first open is sensed, the receiver is reconfigured into a state which removes dial tone.
4. As the loop is opened and closed by the subscriber's dial impulse springs, a battery feed device in the receiver successively opens and closes a circuit which changes the binary value of a "sense bit". Sense bits are organized into words and periodically scanned by the operating program. The transitions on the bit pertinent to our call are sensed and counted. Interdigital pauses are detected by timing and the dialed digits are accumulated and stored in memory. If the subscriber used a DTMF station instrument, the receiver would convert received tones into DC marks, encoding a digit at a time and presenting it via a plurality of sense bits.

After the called number has been received, the path between the calling subscriber S1 and the receiver R1 remains connected, for subscriber supervision. The common control CC1 initiates a second network connection between an idle DP sender DP1 and an idle outgoing truck OGT1 to the collocated step-by-step office based upon a software analysis of the dialed digits that indicates such a route will be needed to complete the desired connection.

Figure 2:
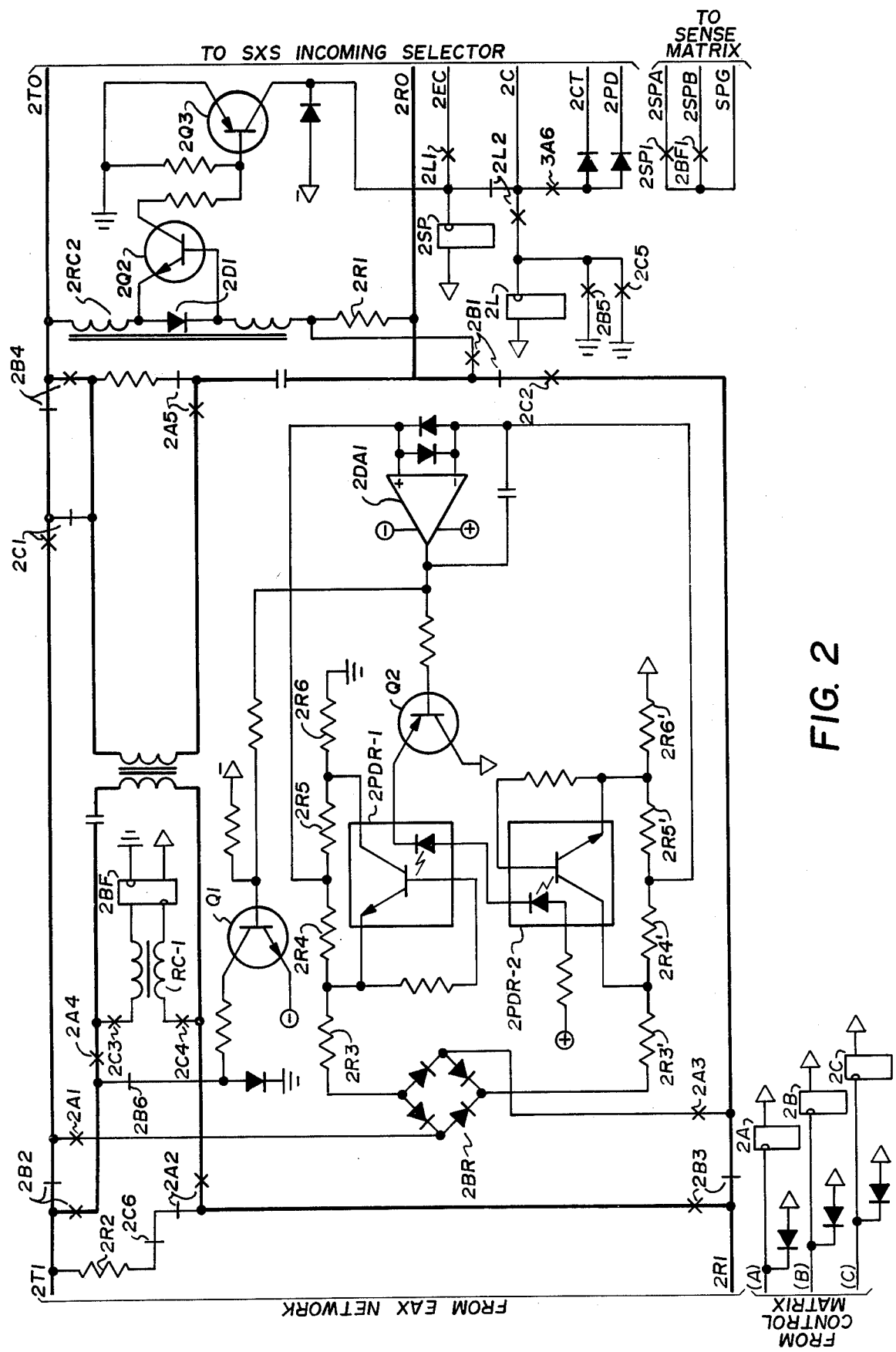
FIG. 2 is a schematic representation of one illustrative embodiment of a circuit including the invention.

The outgoing truck shown on FIG. 2 is arranged with two sense bits designated 2SPA and 2SPB. These convey to the program the supervisory states from the called end and calling end, respectively. Additionally, the circuit is responsive to 3 "control bits". These control bits are also organized into words, which can be "written into" by the operating program. When a specific binary pattern of "1's" and "0's" is written into the three bits pertinent to this trunk circuit, three electronic flip-flops are set and/or reset in a corresponding pattern, resulting in operated and/or released states of three corresponding electromechanical relays 2A, 2B and 2C in the trunk circuit. There are eight possible circuit configurations which can be achieved with contact decoding arrangements of three relays. For example, the combination 2A=1, 2B=0, 2C=1 is designated "TALK SXS". This may be seen to be the result if relays 2A and 2C are operated.

Before this trunk is selected for this call, it is determined to be in the 000=IDLE state. Further, the associated selector in the step-by-step does not have the busy key operated, indicated via an absence of ground on lead 2LC; this is known to software via the called sense bit 2SPA.

While the network path to the dial pulse sender is being established, network terminals 2T1, 2R1 are open in the trunk, providing dry switching of the network. After the path is established, the trunk configuration is changed by software to "BYPASS", by operating relay 2C closing contacts 2C1 and 2C2.

There is now a metallic path between the dial pulse sender and the battery feed ("A") relay of the step-by-step selector. Loop current flowing in this path seizes the selector and is detected in the sender, verifying continuity. Leads 2SPA and 2SPB in the trunk circuit serve no function at this time.

The prefix digits as determined by software are outpulsed by the sender, extending the call to a trunk to the required toll office. ATB indicators available to the step-by-step toll ticketing equipment may also be "read" by electronic exchange software, permitting applicable alternate routes to be chosen, if required.

Depending upon the requirements of the toll office, the called number may be outpulsed in dial pulse form or 2 of 6 Multifrequency (MF). For this example, assume MF.

This outgoing trunk is now placed in the HOLD state by the operation of relay 2B (relay 2C remains held). This results in the following actions.

A DC bridge is connected across the 2TO and 2RO leads to hold forward at make contacts 2B1.
Called end supervision is reconnected to lead 2SPA.
Off-hook may be received either via ground on lead 2EC of via reverse battery on leads 2TO and 2RO. The reverse battery sensor is in series with the forward DC holding bridge, including contacts 2B1 and coil 2RC2.
Leads 2T1 and 2R1 are open to the network at contacts 2A2, 2A4 and 2C6.

An idle MF sender is selected, and a network path established to this trunk. The trunk circuit is now placed in state TALK LOCAL by the operation of relay 2A, which connects this battery feed to the network 2T1 and 2R1 leads at contacts 2A2 and 2A4. A DC bridge in the MF sender operates the trunk battery feed which activates lead SPB, providing software with a verification of network continuity. Meanwhile, lead SPA is monitored for stop-start of wink-start signals which indicate the readiness of the distant office to receive. When the proper signals are detected, the sender completes outpulsing the called number.

The trunk circuit is again placed in the HOLD state with relays 2B and 2C operated and the network path to the sender is released. Also, the network path between the calling subscriber and the customer receiver is released, and a new path is established between the subscriber and this trunk.

This trunk is now placed in state TALK SXS relays 2A and 2C operated. This results in:

A metallic path between the calling subscriber and a battery feed in the step-by-step. From the trunk line via lead 2TO, break contacts 2B4 and 2B2, the calling subscriber loop, lead 2R1, break contact 2B3, make contacts 2C2, break contacts 2B1 and via lead 2R0 to the step office.

A high resistance 2R1 (220K) is switched in series with the reverse battery sensor 2Q2 in this trunk.

Calling subscriber supervision is monitored via a high impedance sensor 2BF in this circuit and output to lead 2SPB.

This monitoring circuit is connected to the transmission conductors when relay 2A is operated, in state "TALK SXS". The connection is through make contacts 2A1 and 2A3 to two nodes of the rectifier bridge circuit 2BR. The two DC nodes of plus and minus potential of the bridge circuit are connected via a series of four resistors to battery and ground potential respectively. The resistors in the ground connected path are labeled 2R3, 2R4, 2R5 and 2R6 respectively. The resistors in the battery connected path are correspondingly labeled 2R3', 2R4', 2R5' and 2R6'. Resistors 2R3 and 2R3' in a typical operating example are of 900 ohms while resistors 2R6 and 2R6' are of 1200 ohms. The inner resistors 2R4 and 2R4' have a value of 250,000 ohms while resistors 2R5 and 2R5' are of 300,000 ohms resistance. The junctions of resistors 2R4 and 2R5 are connected to the positive input of a differential amplifier 2DA1 and the junction of resistors 2R4' and 2R5' is connected to the negative input of the differential amplifier. Connected across the series path of resistors 2R4 and 2R5 is a shunt path of the emitter to collector path of the transistor of the photo couple 2PDR1, with a corresponding connection across resistors 2R4' and 2R5' by the photo couple 2PDR2. The output of the differential amplifier 2DA1 is connected to the base of an amplifying transistor 2Q2, with the output from the emitter of transistor 2Q2 connected in a series path through the diodes of the photo couples 2PDR1 and 2PDR2 and a resistor to a positive potential source. Thus when the subscriber goes on-hook as in a momentary flashing of his hookswitch the node voltages connected to the inputs of the differential amplifier are upset causing an output current to flow from its output which is amplified by the transistor 2Q2 to drive a current through the two photo diodes. The photo diodes activate the associated transistors to shunt the resistors 2R4, 2R4', 2R5 and 2R5' to decrease the shunt resistance presented to the line conductors, and thus maintain an "off-hook" condition to the step-by-step exchange until the unbalance condition is eliminated or this sensing circuit is disconnected from the conductors by the control complex.

In the "TALK SXS" state the relay 2B is not operated and therefore the ground side of relay 2BF is not connected to the calling line conductors and thus would not detect the subscribers "on-hook" condition. To overcome this the base of transistor 2Q1 is also connected to the output of the differential amplifier 2DA1. This transistor is turned on whenever the differential amplifier has an output in response to detecting an "on-hook" condition to operate relay 2BF to extend the supervision to lead 2SPB.

Tones such as ring-back-tone from the extended call are heard by the calling party.

When the called party answers, reverse battery or ground on lead 2EC causes relay 2SP to be activated marking lead 2SPA. Software initiates a charge call indication in memory and commences to time the call.

Assuming that the calling party has 3-way calling service and wishes to temporarily add a 3rd party to the call, he first flashes his hookswitch, causing relay 2BF to momentarily release and mark lead 2SPB at contacts 2BF1 to respond with a disconnect indication. The subscriber monitoring sensor circuitry electronically switches a holding configuration on the tip and ring, preventing the disconnect indication from being propagated forward.

Software times the disconnect supervision; in less than two seconds the flash is completed, returning the supervision to off-hook and releasing the forward holding circuit. The subscriber loop resumes holding forward.

In response to the flash, this circuit is placed in the HOLD state relays 2B and 2C operated, the network path is released, and the subscriber is connected to a receiver, provided with dial tone, and the new call is established. Via hookswitch signals, the subscriber indicates to software that the 3-way call is to be established. Network paths are established between an idle 3 port circuit, the calling party and each of the two called parties. After the path is established, this circuit is placed in the CONTINUITY CHECK state relay 2B operated and the associated port of the 3-port is temporarily configured with a battery feed relay on the tip and ring. A resistor 2R2 across the network terminals 2T1 and 2R1 of this circuit operates the battery feed, activating a sense bit associated with that port, and verifying network continuity.

This circuit is now placed in the TALK TANDEM state, with relays 2A and 2B operated, and the 3-way call ensues.

If the calling party again wishes to converse privately with the party connected via this trunk, hookswitch signals again cause software to restore the TALK SXS configuration with an intermediate HOLD state while network paths are being changed.

When the calling party disconnects, software times as before. When the disconnect interval exceeds two seconds, this circuit is returned to the IDLE state relays 2A, 2B and 2C released, releasing the forward connection. The network path is restored and the subscriber's cut-off relay is restored to reconnect the line relay.

Applicable charging data is input to the AMA equipment.

INTERFACE TO INCOMING SELECTOR

When this circuit is associated with a "local" type of incoming selector, only a tip and ring pair to the selector is needed to provide all the operational features of the circuit. However, lead "2C" is monitored while the circuit is idle so that operation of the selector busy key is recognized as an out of service (OS) condition.

A selector of the type used with SATT ticketers can also be used. This combination returns answer supervision on an "EC" lead which is monitored by this circuit via the collector of the relay driver 2Q3, thus bypassing the input. This selector also requires ground on a 2PD (pad) lead if the calling party is a local subscriber's line. In a class 5 office only, lead 2PD is always grounded during transmission states.

What is claimed is:

1. An electronic sensing circuit for use with a telephone communication circuit of two-wire configuration and including off-hook and on-hook conditions, comprising: a first voltage divider network including a first and a second pair of series connected resistor elements having a mid-point connection between said pairs of series connected resistors and having one circuit end thereof connected to a first wire of said two-wire communication circuit and the other circuit end thereof connected to a voltage supply source, a second voltage divider network including another two pairs of series connected resistor elements having a mid-point connection between said pairs of series connected resistors and having one circuit end thereof connected to a second wire of said two-wire communication circuit and the other circuit end thereof connected to ground potential, and further including a first and a second connection respectively to the junction of each of said resistors of each said pair of resistors of said first voltage divider network to a first shunting means and a third and fourth connection respectively to the junction of each of said resistors of each said pair of resistors of said second voltage divider network to a second shunting means, said mid-point connections being at the same voltage potential with said communication circuit in said on-hook condition and having a difference of voltage potential there-between with said communication circuit in said off-hook condition, and differential voltage detecting means connected between said mid-point connections for providing a first output signal during said on-hook condition and for detecting said voltage difference occurring with said off-hook condition of said communication circuit to provide a second output signal, and means responsive to said detecting means for operating said shunting means upon the detection of an on-hook condition after an off-hook condition to present a lower impedance to said communication circuit.

2. An electronic sensing circuit as claimed in claim 1 wherein the two-wire communication circuit presents a balanced impedance to said first and second voltage divider networks.

3. An electronic sensing circuit as claimed in claim 1 wherein said differential voltage detecting means comprises a differential amplifier circuit.

4. An electronic sensing circuit as claimed in claim 1 further including:
a bridge rectifier circuit having four diode legs and connected between said two-wire communication circuit and said first and second voltage divider networks.

5. An electronic sensing circuit as claimed in claim 2 wherein said differential voltage detecting means comprises a differential amplifier circuit.

6. An electronic sensing circuit as claimed in claim 3 further including:
a bridge rectifier circuit having four diode legs and connected between said two-wire communication circuit and said first and second voltage divider networks.

* * * * *